United States Patent [19]

Lunde et al.

[11] Patent Number: 4,649,402

[45] Date of Patent: Mar. 10, 1987

[54] ELECTROGRAPHIC STYLUS RECORDING APPARATUS

[75] Inventors: George G. Lunde; Earl K. Hoyne, both of Fridley; Charles K. Nordeen, St. Paul, all of Minn.

[73] Assignee: Minnesota Mining and Manufacturing Company, St. Paul, Minn.

[21] Appl. No.: 837,415

[22] Filed: Mar. 7, 1986

[51] Int. Cl.[4] .................... G01D 15/6

[52] U.S. Cl. .................... 346/153.1; 346/150

[58] Field of Search .................... 346/153.1, 150, 155

[56] References Cited

U.S. PATENT DOCUMENTS 4,460,907 7/1984 Nelson .................... 346/153.1

4,464,672 8/1984 Lindahl .................... 346/153.1

*Primary Examiner*—Arthur G. Evans

*Attorney, Agent, or Firm*—Donald M. Sell; James A. Smith; Robert L. Marben

[57] ABSTRACT

An electrographic stylus recording apparatus producing a toner powder image on a receptor belt wherein non-imaging toner powder is collected at a cylindrical sleeve located downstream from the stylus array and is subsequently returned from the cylindrical sleeve to the upstream side of the stylus array by depositing toner powder from the cylindrical sleeve onto the receptor belt by adjustment of the toner powder on the cylindrical sleeve relative to the space between the cylindrical sleeve plus the application of a d.c. voltage to the cylindrical sleeve.

4 Claims, 2 Drawing Figures

ELECTROGRAPHIC STYLUS RECORDING APPARATUS

BACKGROUND OF THE INVENTION

1. Field of the Invention

The invention presented herein relates to the field of electrographic stylus recording apparatus capable of producing a toner powder image on a receptor belt and, more particularly, to the structure providing for return to the toner powder applicator of the apparatus that toner powder which is presented for imaging but is not used as a part of the toner powder image.

2. Description of the Prior Art

U.S. Pat. No. 4,460,907 issued July 17, 1984 to Kerry S. Nelson discloses an electrographic magnetic stylus recording apparatus capable of producing an unfixed or nonpermanent toner powder image on a receptor belt. A stylus array is positioned adjacent to the receptor belt to provide a recording gap. Toner powder is provided to the recording gap as the receptor belt is moved. A toner powder image is formed in accordance with electrical signals selectively applied to the styli of the stylus array. Since the toner powder image that is formed is unfixed or nonpermanent, the apparatus provides for reuse of the toner powder. Toner powder that is not held on the receptor belt as a part of the toner image by an electrical charge is collected downstream from the area where the toner image is formed and returned by gravity to the portion of the apparatus where toner is supplied to the receptor belt for movement to the recording gap. The use of gravity as a part of the toner return or recirculation arrangement limits the configuration of an electrographic magnetic stylus recording apparatus for providing a toner powder image. Further, it is important to minimize the abrasive action to which the toner powder is subjected to lengthen the useful life of the toner powder in the case of apparatus providing an unfixed toner powder image where the toner powder is reused.

SUMMARY OF THE INVENTION

The invention presented herein avoids the disadvantages present in the prior art apparatus to provide an improved electrographic stylus recording apparatus for use with magnetically attractable toner powder which includes a stylus array; a receptor recording belt spaced from the stylus array for providing a recording region with the receptor recording belt adapted for movement past the stylus array; a toner powder applicator for applying toner powder to the receptor recording belt for providing toner powder to the recording region; toner powder collecting means downstream of the stylus for magnetically removing toner powder that is carried loosely on the recording belt, the toner powder collecting means including a cylindrical sleeve member adapted for rotation within which a magnetic field producing means is disposed, the cylindrical sleeve member being positioned near the receptor recording belt. The improvement resides in the structure provided for the transport of toner powder from the toner powder collecting means to the toner powder applicator including means providing for operation of the toner powder collecting means as a toner applicator for applying toner powder at the toner powder collecting means to the receptor recording belt as the receptor recording belt is moved, movement of the receptor recording belt returning the applied toner powder to the toner powder applicator. Such last-mentioned means includes a two-position doctor blade member disposed near the cylindrical sleeve member, the doctor blade member being adapted to present a gap between the doctor blade member when the recording apparatus is operative to record toner images on the receptor recording belt and to present a larger gap between the doctor blade member when it is desired that toner powder at the toner powder collecting means be returned to the toner powder applicator, the larger gap permitting more toner powder to be supplied on the cylindrical sleeve member causing the toner powder to bridge the gap between the cylindrical sleeve member and the receptor recording belt; a connection at the cylindrical sleeve member for applying a d.c. voltage to the cylindrical sleeve member when the doctor blade member is positioned to provide the larger gap whereby toner powder bridging between the cylindrical sleeve member and the receptor recording belt is deposited on the receptor recording belt for movement to the toner powder applicator presents the larger gap causing toner powder bridging between the cylindrical sleeve member and the receptor recording belt to be held to the receptor recording belt for movement by the receptor recording belt to the toner powder applicator. The direction of movement of the belt can be the same as that used when the toner powder applicator is used to apply toner powder to the belt or can be in the opposite direction.

A further aspect of the invention resides in the use of a doctor blade member that is "C"-shaped to provide a reservoir to hold toner powder collected by the toner powder collecting means.

BRIEF DESCRIPTION OF THE DRAWINGS

The present invention will be more thoroughly described with reference to the accompanying drawings wherein.

DETAILED DESCRIPTION

The electrographic stylus recording apparatus embodying the invention presented herein is one which carries out a printing or recording process which is commonly referred to as electrographic magnetic stylus recording. This process has been described in several articles, such as the one by L. W. Carlson, "Electrographic Magnetic Stylus Recording; A High Speed Non-Impact Magnetic Printing Process," IEEE Transactions of Magnetics, Vol. May-17, No. 6, November 1981. Several references are listed in the article which are pertinent to the recording process. Such process is utilized in the apparatus disclosed in U.S. Pat. No. 4,460,907, supra. As in the apparatus of the such patent, the apparatus embodying the present invention is used to produce nonpermanent or unfixed toner images and provides for return of toner powder that is collected for reuse in the recording process. Magnetically attractable, electronically conductive toner powder is used.

Figure 1:
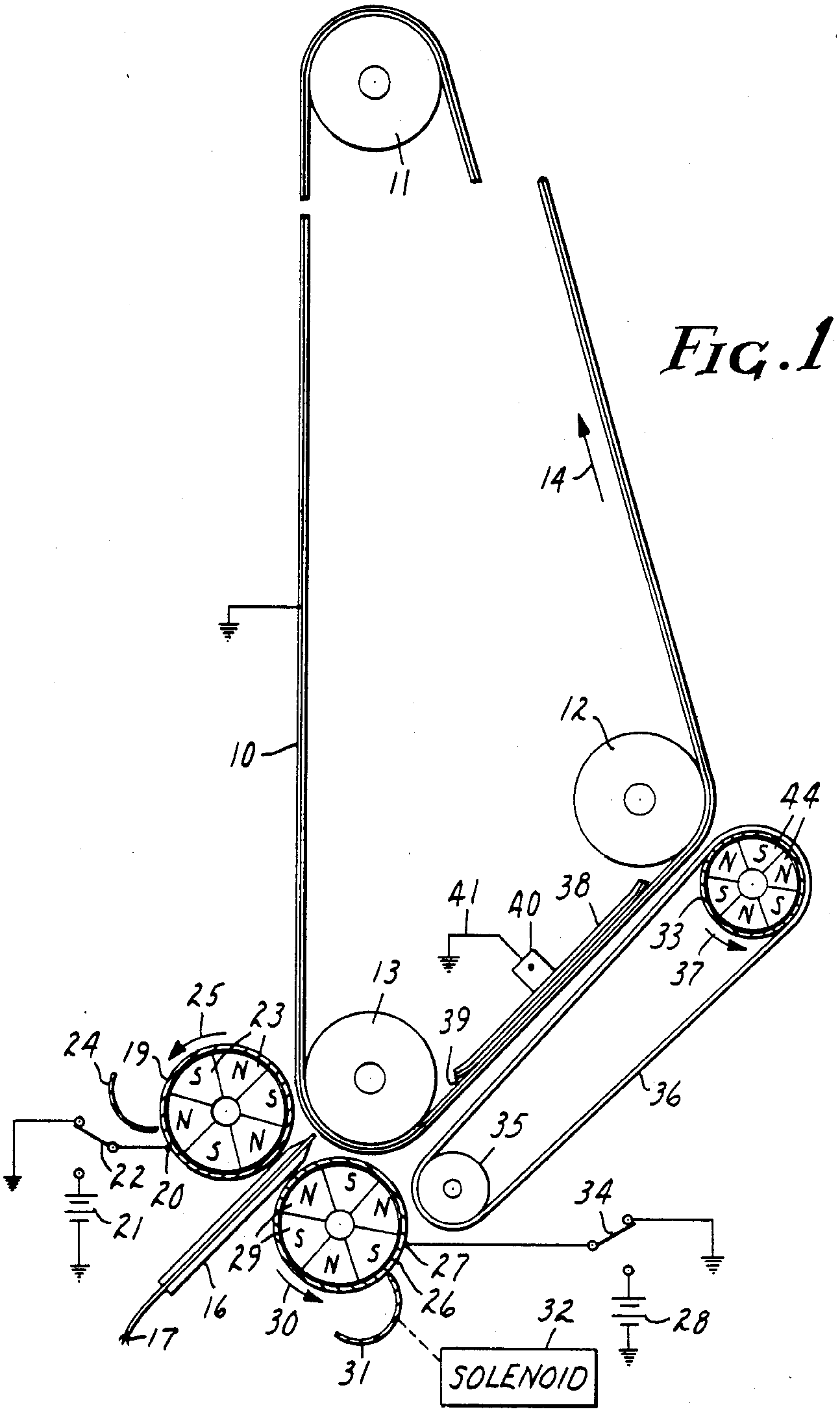
FIG. 1 is a schematic side view of apparatus embodying the invention.

Referring to FIG. 1 of the drawing, the apparatus embodying the invention presented herein is diagrammatically shown and includes a receptor recording belt 10 which is flexible and includes a backing layer of a material such as polyester on which a thin dielectric layer is carried with a thin conductive layer intermediate the dielectric layer and the polyester. It should be noted that due to the size of the apparatus, a portion of the belt 10 has been removed in the drawing so that other portions of the apparatus can be presented to clearly show various details. The conductive layer can be indium tin oxide, for example. The conductive layer of the belt 10 is represented by the center line of the side view of belt 10 in FIG. 1 and is connected to ground. One way for making such connection involves having the width of the dielectric layer less than the width of the conductive layer allowing the conductive layer to be contacted by a conductive brush that is connected to ground. Since a wear problem is presented, it is desirable to have the edge of the conductive layer to be contacted covered with a durable conductive coating. For example, graphite applied using a mixture of graphite and alcohol will provide such a coating. One or more driven rolls, represented at 11–13, move and direct the receptor belt in a counterclockwise direction as viewed in FIG. 1 and indicated by the arrow 14. The dielectric layer of the belt 10 is presented at the outer surface of the belt. The drive means for the driven roll(s) includes an electric motor (not shown). The inner surface of the receptor recording belt makes contact with the rolls 11–13.

A stylus electrode array 16 is positioned on the dielectric layer side of the receptor recording belt 10 opposite the roller 13. The stylus electrode array extends generally perpendicular to the receptor recording belt 10 and transverse to the direction of movement of the receptor recording belt. The stylus electrode array 16 includes a number of parallel conductive styli that are closely spaced and insulated from one another. Conductors indicated at 17, one for each stylus, are used for selectively applying recording electrical signals to the styli from a source (not shown). The stylus electrodes are preferably comprised of magnetic permeable material. The array 16 is positioned so one end of each stylus electrode is a relatively short distance from the receptor recording belt 10 establishing a recording region or gap at each stylus to which toner powder is delivered. The recording gap preferably should be large enough so a plurality of toner particles, forming at least one elongate toner chain-like aggregate, can be accommodated in the gap at each stylus electrode thereby insuring a suitable electronically conductive path between the tip of each stylus electrode and the receptor recording belt to cause toner particles to be held by an electrical charge to the receptor recording belt 10 opposite a given stylus electrode whenever an electrical signal is applied to such stylus electrode.

A toner powder applicator in the form of a first rotatable, electrically conductive, cylindrical sleeve 19 is positioned on the upstream side of the stylus array 16 within a short distance of the stylus array 16 and the receptor recording belt 10. The sleeve 19 has a connection 20 to which a d.c. voltage, depicted by the battery 21, can be supplied via a switch means, as indicated by the switch 22. The sleeve 19 is disposed with its axis extending transversely to the styli of the stylus array. The toner powder applicator also includes a non-rotatable magnetic field producing means positioned within the sleeve 19 that provides a plurality of alternate magnetic poles around the inner surface of the sleeve 19. The magnetic field producing means can be formed by a number of magnet sectors 23. In the embodiment shown in FIG. 1, six magnet sectors 23 are used. The magnetic field producing means is positioned so a magnet sector presenting a north (south) magnetic pole is positioned directly opposite the stylus array 16 for use in providing magnetic flux at the recording ends of the styli. With the magnetic field producing means so positioned, the south (north) magnetic pole, adjacent to the north (south) magnetic pole opposite the stylus array, is positioned directly opposite the receptor recording belt 10. The toner applicator also includes a doctor blade member 24 for controlling the depth of toner powder to be presented on the sleeve 19. A "C"-shaped doctor blade member 24 is shown, the "C"-shape serves to provide sufficient capacity for holding the amount of toner powder that is needed for an apparatus of the type disclosed wherein the toner powder is reused. When the apparatus is operated to produce a toner powder image the sleeve 19 is rotated and is connected by the switch 22 to the d.c. voltage 21. While the sleeve 19 can be rotated in either direction, counterclockwise movement, as indicated by the arrow 25, is preferred. This causes toner powder to be presented to the gap between the sleeve 19 and the receptor recording belt 10. The toner powder bridges the gap between the sleeve 19 and the receptor recording belt 10 due to the magnetic flux present at the gap and due to the applied d.c. voltage toner powder is held to the belt by an electrical force allowing toner powder to be moved in a controlled manner to the recording gap at the stylus array. The toner powder applicator also functions to remove excess toner powder from the recording gap due to the magnetic field presented by the magnetic field producing means within the sleeve 19 and rotation of the sleeve 19 thus providing further control over the amount of toner powder in the recording gap.

During an image recording operation the toner powder presented to the recording gap will bridge the gap due to the magnetic flux present at the end of each styli. Those styli receiving an electrical signal will cause toner powder opposite each such stylus to be held to the receptor recording belt 10 and thus cause a toner image to be formed which is carried downstream from the recording gap by movement of the belt 10. Accordingly all the toner powder is not used to form an image so such excess toner powder and other toner powder held loosely on the belt 10 as the belt moves downstream must be removed to have a clear toner powder image present for viewing as the belt 10 moves downstream of the roller 12. A second rotatable, electrically conductive, cylindrical sleeve 26 is positioned on the downstream side of the stylus array 16 within a short distance of the stylus array 16 and the receptor recording belt 10. Like sleeve 19, sleeve 26 has a connection 27 to which a d.c. voltage, depicted by battery 28, can be supplied via switch means, as indicated by the switch 34. The sleeve 26 is disposed with its axis extending transversely to the styli of the stylus array. Like sleeve 19, the sleeve 26 has a non-rotatable magnetic field producing means positioned within sleeve 26 that provides a plurality of alternate magnetic poles around the inner surface of the sleeve 26. This magnetic field producing means can be formed by a number of magnet sectors 29. In the embodiment shown in FIG. 1, six magnet sectors 29 are used. The magnetic field producing means for sleeve 26 is positioned so a magnet sector presenting a north (south) magnetic pole is positioned directly opposite the stylus array 16 to provide like magnetic poles on opposite side of the stylus array. This magnetic pole adds to the magnetic flux provided at the recording ends of the styli by the north (south) magnetic pole positioned on the upstream side of the stylus array 16. With the magnetic field producing means in sleeve 26 so positioned, the south (north) magnetic pole, adjacent to the north (south) magnetic pole positioned opposite the stylus array, is positioned directly opposite the stylus receptor recording belt 10. The sleeve 26 can be arranged to rotate either clockwise or counterclockwise. Counterclockwise rotation is preferred as indicated by the arrow 30. When the apparatus is operated to produce toner powder images the sleeve 26 is not connected to a d.c. voltage, but is preferably connected to ground via the switch 34. During such operation excess toner powder at the recording region and toner powder loosely held on the belt 10 in the area a short distance downstream from the recording gap is attracted to the sleeve 26 by its magnetic flux producing means and is carried counterclockwise by rotation of the sleeve 26.

As in the case of the sleeve 19, the sleeve 26 has a doctor blade member 31 which serves to control the thickness of the toner powder carried on the outer surface of sleeve 26. Unlike the doctor blade member 24, the doctor blade member 31 is arranged to provide two different gaps at the sleeve 26. A small gap is provided when the apparatus is operated to produce a toner powder image. The small gap keeps the thickness of the toner powder on the sleeve 26 at a level such that it does not touch the surface of the belt 10. The doctor blade member 31 is shown presenting the small gap in FIG. 1. A larger gap is provided by the doctor blade member 31 at the sleeve 26 when the apparatus is operated to return toner powder collected at the sleeve 26 to the upstream side of the stylus array 16, as will be explained. The doctor blade member 31 is shown as a "C"-shaped member to provide sufficient capacity for holding toner powder collected at the sleeve 26. The doctor blade member 31 can be pivotally mounted and linked to a rotary or linear solenoid, as indicated by the solenoid 32, to position the doctor blade member 31 for the desired doctor gap setting.

When six magnet sectors are used within the sleeve 19 and sleeve 26, the positioning of the magnet sectors as described relative to the stylus array 16 and belt 10 can be optimized by placing the centers of rotation for the roller 13 and the sleeves 19 and 26 at the corners of an equilateral triangle. The sleeves 19 and 26 are then of the same diameter.

The arrangement provided by the apparatus shown in FIG. 1 provides a way for returning toner powder from the sleeve 26 to the upstream side of the stylus array 16 without the use of any parts in addition to those already described. It should be noted also that the return of toner powder for reuse, as will be described, does not require any lateral movement of the toner powder so abrasion of the toner is minimized.

When the apparatus of FIG. 1 is to be operated to return toner powder from the area of the sleeve 26 to the upstream side of stylus 16, the belt 10 can be driven either clockwise or counterclockwise, the doctor blade member 31 is positioned to provide the larger doctor gap that has been mentioned and the sleeve 26 is connected to a source of d.c. voltage. Twenty volts have been found to be sufficient. No voltage is connected to the sleeve 19 at this time and it is preferably connected to ground via the switch 22. With the large doctor gap provided at the sleeve 26 sufficient toner is supplied between the sleeve 26 and the surface of the belt 10 which, under the influence of the magnetic flux presented by the south magnetic pole positioned opposite the belt 10, causes the toner powder to stand up, forming toner trees to bridge the space between the sleeve 26 and the belt 10. With the d.c. voltage applied to the sleeve 26, the toner powder is caused to be held on the belt 10 as it moves carrying the toner powder away from the sleeve 26 to the upstream side of the stylus 16. The toner powder is then either removed from the belt 10 when it reaches the sleeve 19 where it is magnetically attracted to the sleeve or is redeposited on the belt 10 for the next image should it reach the sleeve 19 when a d.c. voltage is applied to sleeve 19 for operation of the apparatus to create a toner image. In this later case, removal of the toner powder brought on the belt 10 to the sleeve 19 and disposition of a layer of toner powder on the belt 10 at the sleeve 19 occurs simultaneously. In such case, the function of transporting toner collected on the .downstream side of the stylus array 16 to the upstream side of the stylus array for reuse is accomplished even if the recirculated toner is not removed from the belt 10.

Figure 2:
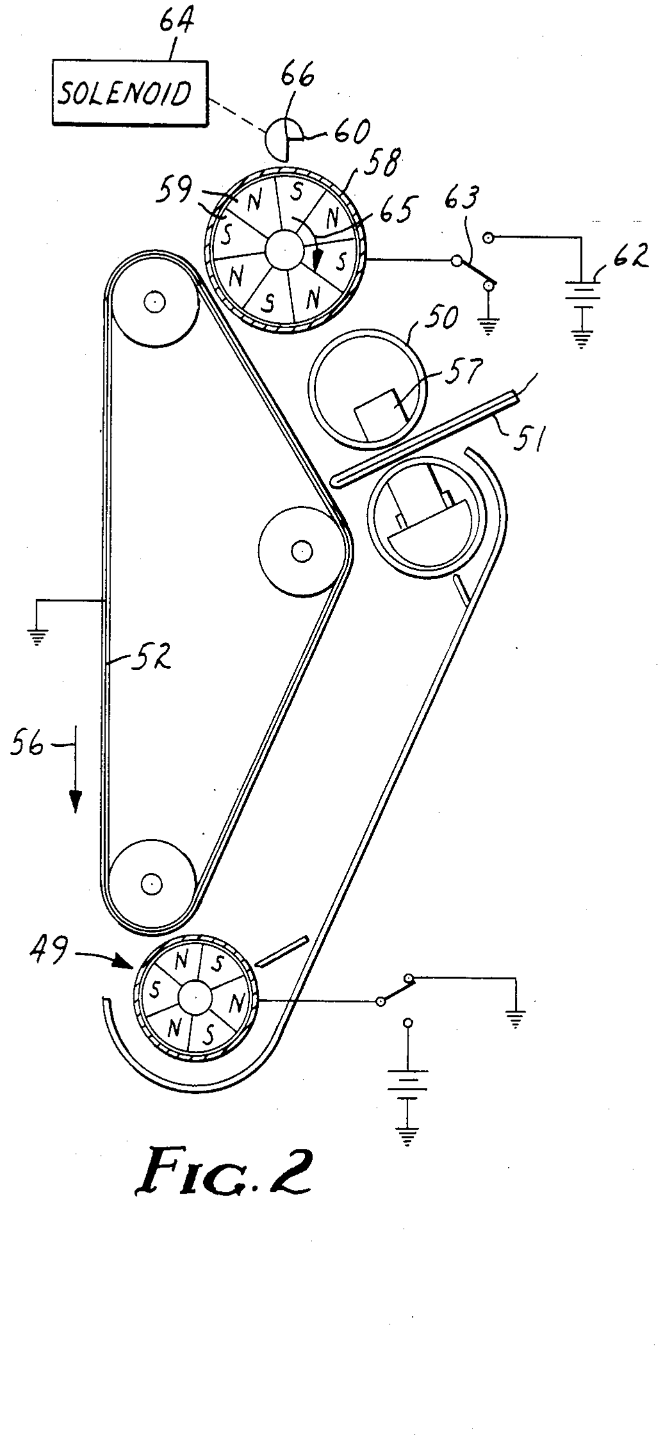
FIG. 2 is a schematic side view of another apparatus embodying the invention.

The use in an electrographic stylus recording apparatus of a doctor blade means for providing two different gaps at a magnet roll structure of the apparatus on the downstream side of the stylus array that is used to gather both the excess toner powder and background or non-imaging toner powder with the sleeve of the magnet roll connectable to a source of d.c. voltage for the purpose of returning such collected toner powder to the upstream side of the stylus array is not limited to the electrographic stylus recording apparatus shown in FIG. 1. Such an arrangement can also be applied to an electrographic stylus recording apparatus of the type disclosed in U.S. Pat. No. 4,460,907, supra, to provide a simplified toner return arrangement for toner collected on the downstream side of the recording region. FIG. 2 is a partial diagrammatic showing of such apparatus with the toner recirculation arrangement described above applied to the apparatus. Referring to FIG. 2, an electrographic stylus recording apparatus is shown wherein a rotatable, cylindrical sleeve 50 is positioned on the downstream side of a stylus array 51. A receptor recording belt 52 is adapted for movement about three rollers 53–55. The belt 52 moves counterclockwise as indicated by the arrow 56 when a toner powder image is to be recorded. The stylus array 51 is positioned close to the belt 52 to provide a recording region to which toner powder is delivered to the upstream side of the stylus array 51 when a toner powder image is to be formed such as in the manner previously described in connection with the apparatus of FIG. 1. The toner applicator for apparatus of FIG. 2 is indicated generally at 49. A magnetic flux producing means, such as a single magnet 57 or multiple magnetic pole magnet structure as described in connection with FIG. 1 is positioned within the sleeve 50 to provide the desired magnetic flux at the recording ends of the styli of the stylus array 51. As in the case of the apparatus of FIG. 1, toner powder will be attracted to the sleeve 50 when the apparatus is operated to produce a toner powder image at the recording region using toner powder supplied to the recording region on the belt 52 which receives toner powder from the toner applicator at 49. Downstream of the sleeve 50 is a magnet roll structure which includes a non-rotatable cylindrical sleeve 58 within which a multiple magnetic pole structure 59 is positioned which is adapted for rotation clockwise as indicated by the arrow 65. This magnet roll structure is positioned to attract toner powder from the sleeve 50 as well as background toner powder, i.e. toner powder that is held loosely to the belt 52. In the case of the corresponding magnet roll structure in U.S. Pat. No. 4,460,907, supra, a dam structure mounted on the outside of the sleeve 58 directs toner powder to at least one end of the sleeve 58 where it falls via gravity along a chute to the toner powder hopper for the toner applicator 49 which is upstream from the stylus array 51. The invention presented herein eliminates the need for the dam and chute in that a doctor blade member 60 is positioned which is arranged to provide a first gap at the sleeve 58 when the apparatus is operated to produce toner powder images so that background toner powder removed from the belt 52 will not build up on the sleeve 58 to disrupt the toner powder image. The doctor blade member 60 is also arranged to provide a larger gap at the sleeve 58 when the apparatus is operated to return toner powder to the upstream side of the stylus array. Such operation, as has been described in connection with FIG. 1, requires that a connection 61 be provided at the sleeve 58 to allow the necessary d.c. voltage to be applied to the sleeve 58. The d.c. voltage is depicted by the battery 62 and is applied to the connection 61 via the switch means which is shown by the switch 63. Accordingly, when toner powder is to be moved from the sleeve 58 to the belt 52 and thence to the upstream side of the stylus array, the belt 52 is placed in motion, clockwise or counterclockwise with the large gap provided by the doctor blade member 60 and with the switch 63 operated to provide the d.c. voltage to the sleeve 58. The large gap allows toner powder at the gap between the belt 52 and the sleeve 58 to form toner trees which bridge the gap and with the d.c. voltage applied to the sleeve 58 causes toner powder to be held on the belt 52 for return to the upstream side of the stylus array for reuse during operation of the apparatus for producing a toner image.

The apparatus of FIG. 2 has been described as disclosed in U.S. Pat. No. 4,460,907, supra, wherein the sleeve 58 does not rotate with the multiple magnetic pole structure 59 arranged for rotation. The preferred arrangement is one where the sleeve 58 is adapted for rotation counterclockwise with the multiple magnetic pole structure 59 stationary with a magnetic pole positioned directly opposite the belt 52 and another of the magnetic poles positioned directly opposite the sleeve 50. This makes for more efficient transfer of toner powder from the sleeve 50 to sleeve 58 and also implements the formation of toner trees for bridging the gap between the belt 52 and the sleeve 58 when the apparatus is operated for return of toner powder to the upstream side of the stylus array 51. When the apparatus is not operated for returning toner powder, the switch 63 is operated so the sleeve 58 is connected to ground.

The doctor blade member 60 shown depicts a form that can be used to provide the two desired gap settings. It is shown in position for providing the smaller gap. Upon rotation in a clockwise direction for a short distance the larger gap is provided. As in the case of the arrangement shown in FIG. 1, a rotary or linear solenoid can be used to provide the two gap settings. Solenoid 64 is shown in FIG. 2 to operatively connect to the doctor blade member 60 for such purpose. The doctor blade member 60 is arranged for rotation about the point 66. The "C"-shaped doctor blade member 31 used in the apparatus of FIG. 1 could also be used as the doctor blade member 60 in FIG. 2.

The use of the doctor blade member 31 in the apparatus of FIG. 1 serves to provide sufficient toner powder on sleeve 26 so that toner powder presented to the belt 10 will be deposited when a d.c. voltage is applied to the sleeve 26 to enable use of the receptor recording belt for returning toner powder to the upstream side of the stylus array 16. The doctor blade member 60 provides the same function in the apparatus of FIG. 2. It can then be appreciated that sufficient toner powder can also be provided on the sleeve 26 by moving the sleeves 26 closer to the belt 10 or by movement of the sleeve 26 toward the belt in conjunction with an increase in the gap provided by the doctor blade member 31 when it is desired that the apparatus be operated so that the toner powder at sleeve 26 be deposited on the belt 10.

While there has been described what is at present considered to be the preferred embodiments of the invention, it will be understood that various modifications, as noted above, may be made therein and it is intended to cover in the appended claims all such modifications as fall within the true spirit and scope of the invention.

We claim:

1. An improved electrographic stylus recording apparatus for use with magnetically attractable toner powder which includes a stylus array; a receptor recording belt for providing a recording region with the receptor recording belt adapted for movement past the stylus array; a toner powder applicator for applying toner powder to the receptor recording belt for providing toner powder to the recording region; toner powder collecting means downstream of the stylus for magnetically removing toner powder that is carried loosely on the recording belt, the toner powder collecting means including a cylindrical sleeve member adpated for rotation within which a magnetic field producing means is disposed, the cylindrical sleeve member being positioned near the receptor recording belt, the improvement providing transport of toner powder from the toner powder collecting means to the toner powder applicator including:

means providing for operation of the toner powder collecting means as a toner applicator for applying toner powder at the toner powder collecting means to the receptor recording belt as the receptor recording belt is moved, movement of the receptor recording belt returning the applied toner powder to the toner powder applicator.

2. An improved electrographic stylus recording apparatus according to claim 1 wherein said last-mentioned means includes:

a two-position doctor blade member disposed near the cylindrical sleeve member, said doctor blade member adapted to present a gap between said doctor blade member when the recording apparatus is operative to record toner powder images on the receptor recording belt and to present a larger gap between said doctor blade member when it is desired that toner powder at the toner powder collecting means be returned to the toner powder applicator, the larger gap permitting more toner powder to be supplied on the cylindrical sleeve member causing the toner powder to bridge the gap between the cylindrical sleeve member and the receptor recording belt;

a connection at the cylindrical sleeve member for applying a d.c. voltage to the cylindrical sleeve member when said doctor blade member is positioned to provide the larger gap whereby toner powder bridging between the cylindrical sleeve member and the receptor recording belt is deposited on the receptor recording belt for movement to the toner powder applicator presents the larger gap causing toner powder bridging between the cylindrical sleeve member and the receptor recording belt to be held to the receptor recording belt for movement by the receptor recording belt to the toner powder applicator.

3. An improved electrographic stylus recording apparatus according to claim 1 wherein said doctor blade member is "C"-shaped to provide a reservoir to hold toner powder collected by the toner powder collecting means.

4. An improved electrographic stylus recording apparatus according to claim 1 further including a solenoid operatively connected to said doctor blade member for use in providing movement of said doctor blade member for providing said first or second gaps.

* * * * *